United States Patent Office 3,730,922
Patented May 1, 1973

3,730,922
CYCLIC ETHER POLYMERIZATION PROCESS
John Boor, Jr., El Cerrito, Calif., assignor to Shell Oil Company, New York, N.Y.
No Drawing. Filed Aug. 9, 1971, Ser. No. 170,392
Int. Cl. C08g 23/14
U.S. Cl. 260—2 A
8 Claims

ABSTRACT OF THE DISCLOSURE

Cyclic ethers are polymerized in the presence of a catalyst formed by reacting (a) at least one dialkyl compound of zinc, (b) a primary or secondary amine, (c) water and (d) at least one compound of the formula

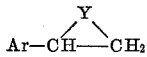

wherein Ar is an aryl radical and Y is oxygen or sulfur. The high molecular weight products are useful, particularly in molding, coating, fiber and film fields of application.

---

This invention relates to a new process for the preparation of polyether-type homopolymers and/or copolymers. More particularly the invention relates to polymerizing cyclic ethers using a novel and very active catalyst system. The invention further relates to novel polymerization catalysts and to a method for preparing them.

The polymerization of cyclic ethers such as alkylene oxides is well known and is discussed, e.g., by J. Furukawa and T. Saegusa, Polymerization of Aldehydes and Oxides, Interscience Publishers, New York (1963). Further it is known from British Pat. 972,898 that it is very difficult to polymerize, e.g., isobutylene oxide, which may, however, be polymerized to high molecular weight employing as a catalyst a mixture of a dialkyl zinc, an organoamine and water.

A new process has now been found for the preparation of high molecular weight polyethers with the aid of a novel catalyst system which is more active than the three component systems described in said British specification.

According to the invention, polyether-type homopolymers and/or copolymers are prepared by a process which comprises polymerizing at least one cyclic ether with a catalyst comprising (a) a dialkyl zinc compound, (b) a primary or secondary amine, (c) water, and (d) at least one compound of the formula

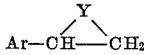

wherein Ar is an aryl radical and Y is selected from oygen and sulfur.

The cyclic ethers to be polymerized are preferably vicinal epoxides, i.e., having a ring that consists of one oxygen atom and two carbon atoms. Cyclic ethers which are hydrocarbyl mono 1,2-epoxides containing up to about nine carbon atoms, e.g., 2 to 8 carbon atoms, are preferred. Some examples of these ethers are ethylene oxide, propylene oxide, butylene oxide, isobutylene oxide, lower alkyl glycidyl ethers, allyl glycidyl ether, phenyl glycidyl ether, styrene oxide, cyclopentene oxide, cyclohexene oxide, butadiene monoxide and the like. The cyclic ethers are preferably alkylene oxides of 2 to 6 carbon atoms, particularly ethylene oxide, propylene oxide, isobutylene oxide, cyclopentene oxide, cyclohexene oxide and mixtures of these. It is especially preferred to employ monomer mixtures wherein isobutylene oxide amounts to at least 50 mole percent (% m.), particularly at least about 75% m. of the total quantity of monomer.

Preferably the catalyst is prepared at a temperature in the range between about 0 to 110° C. by first mixing components (a), (b) and (c) and then contacting the resulting mixture with compound (d). Preferably components (b) and (c) are mixed by adding (b) to (c); in some cases it may be desirable to mix the first three components at a lower temperature, for example, at a temperature from about 10 to about 30° C. Good results are obtained by first mixing components (a) and (d) and then adding components (b) and (c). Catalyst component (a) will preferably contain alkyl radicals, which may be identical or non-identical, of 2 to 7 carbon atoms. Examples of component (a) are diethyl zinc, di-n-propyl zinc, di-n-butyl zinc, n-propyl-isobutyl zinc and n-butyl-isopentyl zinc. It has unexpectedly been found that component (d) failed to enhance activity of a catalyst system prepared with dimethyl zinc and components (b) and (c). Further, it has been found that replacement of these dialkyl zinc compounds with alkyl compounds of other divalent metals such as diethyl cadmium do not result in catalysts effective for polymerization of, e.g., isobutylene oxide. The preferred component (a) is diethyl zinc.

Component (b) is a primary or secondary amine containing up to 18 carbon atoms, amines containing up to 12 carbon atoms being preferred. Examples of component (b) are methylamine, ethylamine, isopropylamine, n-butylamine, pentylamine, hexylamine, cyclohexylamine, methyl cyclohexylamine, diethylamine, dibutylamine, methylpropylamine, methylbutylamine, ethylbutylamine, dichlorohexylamine, aniline, α-naphthylamine, β-naphthylamine, p-ethylaniline, benzylamine, n-ethylaniline, α-phenylallylaniline and β-phenylethylamine and dicyclohexylamine. Cyclic monoamines such as cyclohexylamine are preferred.

Component (c) is water.

Component (d) is at least one compound of the formula

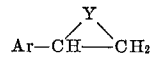

wherein Ar is an aryl radical of up to about a total of 14 carbon atoms, the nucleus of which may be substituted with alkyl groups of 1 to 14 carbon atoms and/or carboxy groups of 1 to 4 carbon atoms and Y is selected from oxygen and sulfur. Preferably, the aryl radical Ar contains up to about 10 carbon atoms. It is also preferred that any nuclear substituent on the aryl radical is non-adjacent to the cyclic substituent, i.e.,

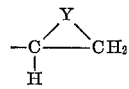

Exemplary are styrene oxide, styrene episulfide, 4-methylstyrene oxide, 4-ethoxystyrene episulfide, vinylnaphthalene oxide, 6-methoxy-vinylnaphthalene oxide, 7-ethyl-2-vinylnaphthalene oxide, 5,7-dimethyl-2-vinylnaphthalene oxide and the like. Preferred as component (d) are styrene oxide and styrene episulfide and mixtures thereof.

In the preparation of the catalyst, the components are preferably employed in molar ratio of zinc compound to amine to water to aryl component (d) from about 1:0.001:0.001:0.5 to 1:1:1:5. Particularly preferred ratios of said zinc compound:said amine:said water:aryl component (d) are from 1:0.01:0.01:1 to 1:0.8:0.8.

The catalyst as a rule is prepared with the use of a solvent; the polymerization may be carried out in the presence or in the absence of a solvent or diluent. Solvents which can be used include ethers such as dialkyl, aryl or cycloalkyl ethers, chloroaliphatic hydrocarbons such as dichloro ether or carbon tetrachloride, aromatic hydrocarbons such as benzene, toluene and xylene and mixtures of these. Aliphatic solvents such as heptane are less suitable.

The four component catalyst system according to the invention is ordinarily in the form of a fine colloidal dispersion compared to the heterogenous catalyst which does not include component (d).

The amount of dialkyl zinc compound employed in the polymerization process will ordinarily vary from about 0.01 to about 5 moles per mole of monomer, amounts from about 0.02 to about 0.5 being preferred.

It is recommended that the catalyst according to the invention be aged at least for half an hour, for example 1 to 24 hours at an elevated temperature, e.g., in the range from about 25–110° C. prior to the polymerization of the cyclic ether. Aging for periods from about 8 to 16 hours at temperatures above 60° C. has been very effective.

The temperature at which the cyclic ethers are polymerized is preferably from about 50 to about 150° C., temperatures between about 70 and 130° C. being most preferred. The high molecular weight polymers obtained in the process according to the invention are rubbers or plastics depending upon the monomers and ratio of monomers employed. Rubbery products, e.g., homopolymers of propylene oxide, ethylene oxide, butadiene monoxide, and cyclopentene oxide as well as copolymers consisting substantially of these are suitably employed, e.g., in adhesive compositions.

It is a particular advantage of the process according to the invention to prepare high molecular weight homopolymers and copolymers of isobutylene oxide suitable for thermoplastic applications such as moldings, coatings, fibers and films.

The invention is further illustrated by the following examples.

In the following examples the bottles used as reaction vessels were previously dried and purged with nitrogen. The monomer was dried with molecular sieves and then distilled from calcium hydride about one hour before each experiment. Solvents were purified as follows: toluene was washed with sulfuric acid, sodium carbonate solution and distilled water then passed through silica gel, mixed with calcium hydride, filtered, distilled from fresh calcium hydride and finally was stored under a nitrogen atmosphere and in the presence of calcium hydride. Heptane was passed through silica gel, distilled from calcium hydride and stored in the manner described for toluene. At the termination of a polymerization the products were added to methanol containing 5% w. hydrochloric or glacial acetic acid; the mixture was allowed to stand overnight and then filtered, followed by drying in under vacuum at 60° C. The reduced specific viscosities (RSV) values shown were determined at a concentration of 0.3 gram of polymer per 100 cc. of O'-dichlorobenzene at 150° C. containing 0.3% by weight of β-naphthylamine inhibitor.

EXAMPLE I

Into an eight ounce bottle were added 25 cc. of toluene, 14 millimoles (mmol) of diethyl zinc and a premixture of 3.8 mmol of cyclohexylamine and 5.5 mmol of water, followed by aging for 2 hours at 25° C., then adding 18 mmol of styrene oxide. The molar ratio of dialkylzinc: amine:water:aryl epoxide was 1:0.27:0.43:1.29. This catalyst mixture according to the invention was aged for 15 hours at 70° C. followed by addition of 22.4 grams of cyclopentene oxide. By polymerization for 72 hours at 70° C. the monomer was 100% converted to an elastomeric polymer which could be molded into bars which were tacky.

For purposes of comparison the procedure was repeated except that component (d) of the catalyst, namely the styrene oxide was omitted and the aging for 15 hours at 70° C., was also omitted. Conversion was only 25%.

EXAMPLE II

Into an eight ounce bottle were added 25 cc. of toluene, 14 mmole of diethyl zinc, and 20 mmol of styrene oxide. After these components aged for 17 hours at 70° C., a mixture of 3.8 mmol of cyclohexylamine and 5.5 mmoles of water were added and this catalyst according to the invention was aged 2 hours at 25° C. Sixteen and one half grams of isobutylene oxide were added and polymerized for 18 hours at 70° C. The polymeric product, which had an RSV of 8.9 dl./g., was recovered in 46% yield.

EXAMPLE III

Into an eight ounce bottle were added 25 cc. of toluene, 14 mmole of diethyl zinc, a mixture of 3.8 mmole of cyclohexylamine and 5.5 mmole of water followed by aging for 2 hours at 25° C., then 20 mmole of styrene oxide was added and this catalyst according to the invention was aged 17 hours at 70° C. resulting in a fine colloidal dispersion. Sixteen and one-half grams of isobutylene oxide were added and polymerized for 18 hours at 70° C. The powdery white poly-(isobutylene oxide) product which had an RSV of 5.4 dl./g. was recovered in 70% yield.

For purposes of comparison this procedure was repeated except that component (d) was omitted and the three component catalyst after aging 2 hours at 25° C. was aged 15 hours (instead of 17 hours) at 70° C. After polymerization of isobutylene oxide for 139 hours the conversion was only 37%.

EXAMPLE IV

Into an eight-ounce bottle were added 25 cc. of toluene, 14 mmoles of diethyl zinc, a mixture of 3.8 mmoles of cyclohexylamine and 5.5 mmoles of water. This mixture was aged for 2 hours at 25° C. followed by the addition of 20 mmoles of styrene oxide and aging for an additional 15 hours at 70° C. The molar ratio in this catalyst according to the invention of zinc compound to amine to water to styrene oxide was 1:0.27:0.43:1.43. Isobutylene oxide monomer in the amount of 16.5 grams were added and the whole heated for 24 hours at 70° C. Fifteen and seven-tenths grams of powdery white polymer were recovered which has an RSV of 6.0 dl./g. The polymer contained about 0.7 gram of poly(styrene oxide).

EXAMPLE V

The procedure of Example IV was repeated except that the styrene oxide was replaced with styrene episulfide and the polymerization temperature was 110° C. About 86% polymer conversion was obtained after 4 hours.

EXAMPLE VI

For purposes of comparison the procedure of Example IV was repeated except that catalyst component (d), the styrene oxide, and the aging step at 70° C. was omitted and the polymerization time was increased. After 42 hours only 12.7 grams of polymer having an RSV of 8.2 dl./g. were obtained.

EXAMPLE VII

The procedure of Example IV was repeated with a catalyst not according to the invention in that the amine, component (b) was omitted. Polymerization of 16.5 grams of isobutylene oxide resulted in only 2 grams of polymer which had an RSV of 1.0 dl./g. This polymer contained about 0.25 gram of poly(styrene oxide).

I claim as my invention:

1. A process which comprises polymerizing at least one vicinal epoxide in the presence of a catalyst formed upon reaction (a) at least one dialkyl zinc compound wherein the alkyl groups, which may be identical or nonidentical, contain from 2 to 7 carbon atoms; (b) a primary or secondary amine containing up to 18 carbon atoms, (c) water, and (d) at least one aryl compound of the formula

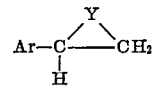

wherein Ar is an aryl radical of up to about a total of 14 carbon atoms selected from phenyl and naphthyl, the nucleus of which may bear substituents selected from alkyl groups of 1 to 4 carbon atoms and carboxy groups of 1 to 4 carbon atoms, provided that any nuclear substituent on said aryl radical is nonadjacent to the cyclic substituent

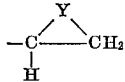

and Y is selected from oxygen and sulfur; the molar ratio of said zinc compound:said amine:water:said aryl component being from 1:0.001:0.001:0.5 to 1:1:1:5.

2. A process as in claim 1 wherein the molar ratio of said zinc compound:said amine:water:said aryl component is from 1:0.01:0.01:1 to 1:0.8:0.8:3.

3. A process as in claim 1 wherein said vicinal epoxide is selected from ethylene oxide, propylene oxide, isobutylene oxide, cyclopentene oxide, cyclohexene oxide and mixtures of these.

4. A process as in claim 1 wherein the vicinal epoxide is at least 50 mole percent isobutylene oxide.

5. The catalyst which forms upon reacting (a) at least one dialkyl zinc compound wherein the alkyl groups, which may be identical or non-identical, contain from 2 to 7 carbon atoms; (b) a primary or secondary amine containing up to 18 carbon atoms; (c) water and as component (d) at least one compound of the formula

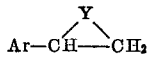

wherein Ar is an aryl radical of up to about a total of 14 carbon atoms selected from phenyl and naphthyl, the nucleus of which may bear substituents selected from alkyl groups of 1 to 4 carbon atoms and carboxy groups of 1 to 4 carbon atoms, provided that any nuclear substituent on said aryl radical is non-adjacent to the cyclic substituent

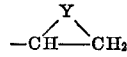

and Y is selected from oxygen and sulfur; the molar ratio of said zinc compound:said amine:water:said aryl component being from 1:0.001:0.001:0.5 to 1:1:1:5.

6. A catalyst as in claim 5 wherein the dialkyl compound is diethyl zinc.

7. A catalyst as in claim 5 wherein component (d) is styrene oxide.

8. A catalyst as in claim 5 wherein component (d) is selected from styrene oxide, styrene episulfide and mixtures thereof.

References Cited
UNITED STATES PATENTS

| | | | |
|---|---|---|---|
| 3,284,374 | 11/1966 | Daimon et al. | 260—2 |
| 3,313,741 | 4/1967 | Uelzmann et al. | 260—2 |
| 3,509,074 | 4/1970 | Kamio et al. | 260—2 |
| 3,598,765 | 8/1971 | Achon | 260—2 EP |

WILLIAM H. SHORT, Primary Examiner

E. A. NIELSEN, Assistant Examiner

U.S. Cl. X.R.

252—431 N, 260—47 EP, 88.3 A, 615 B